Patented June 12, 1928.

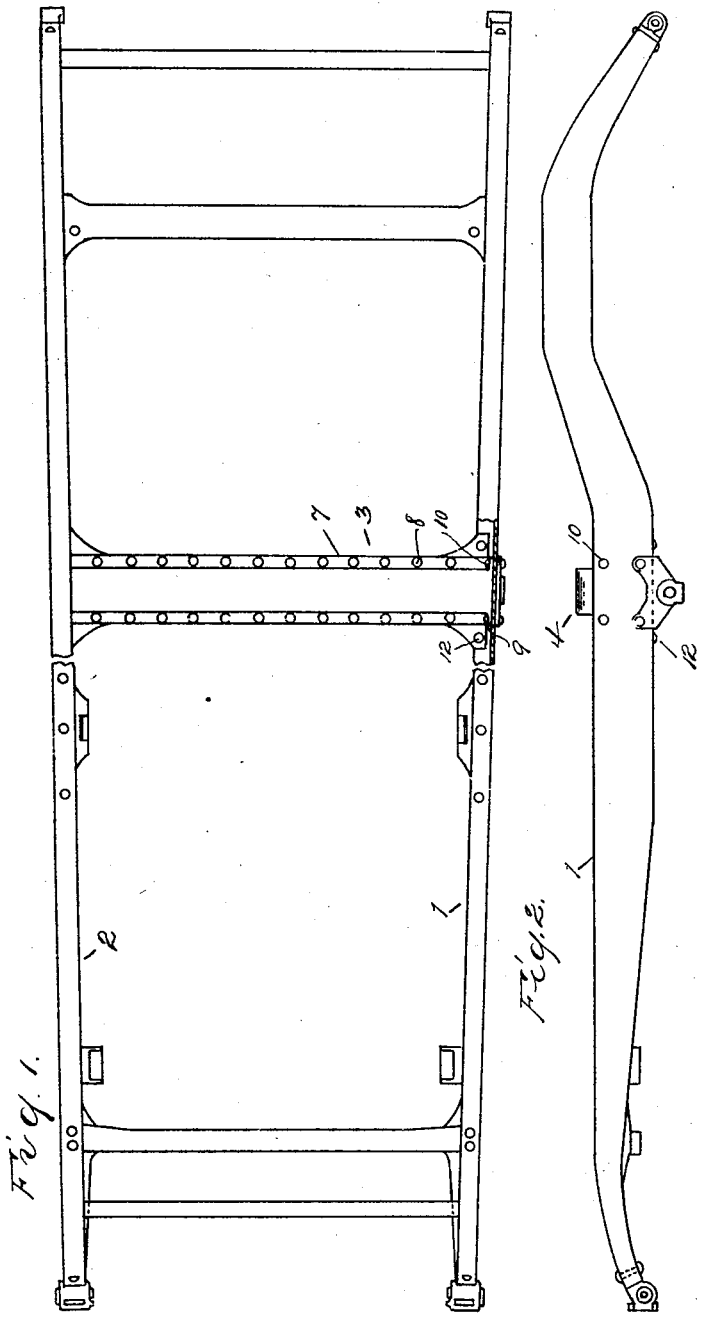

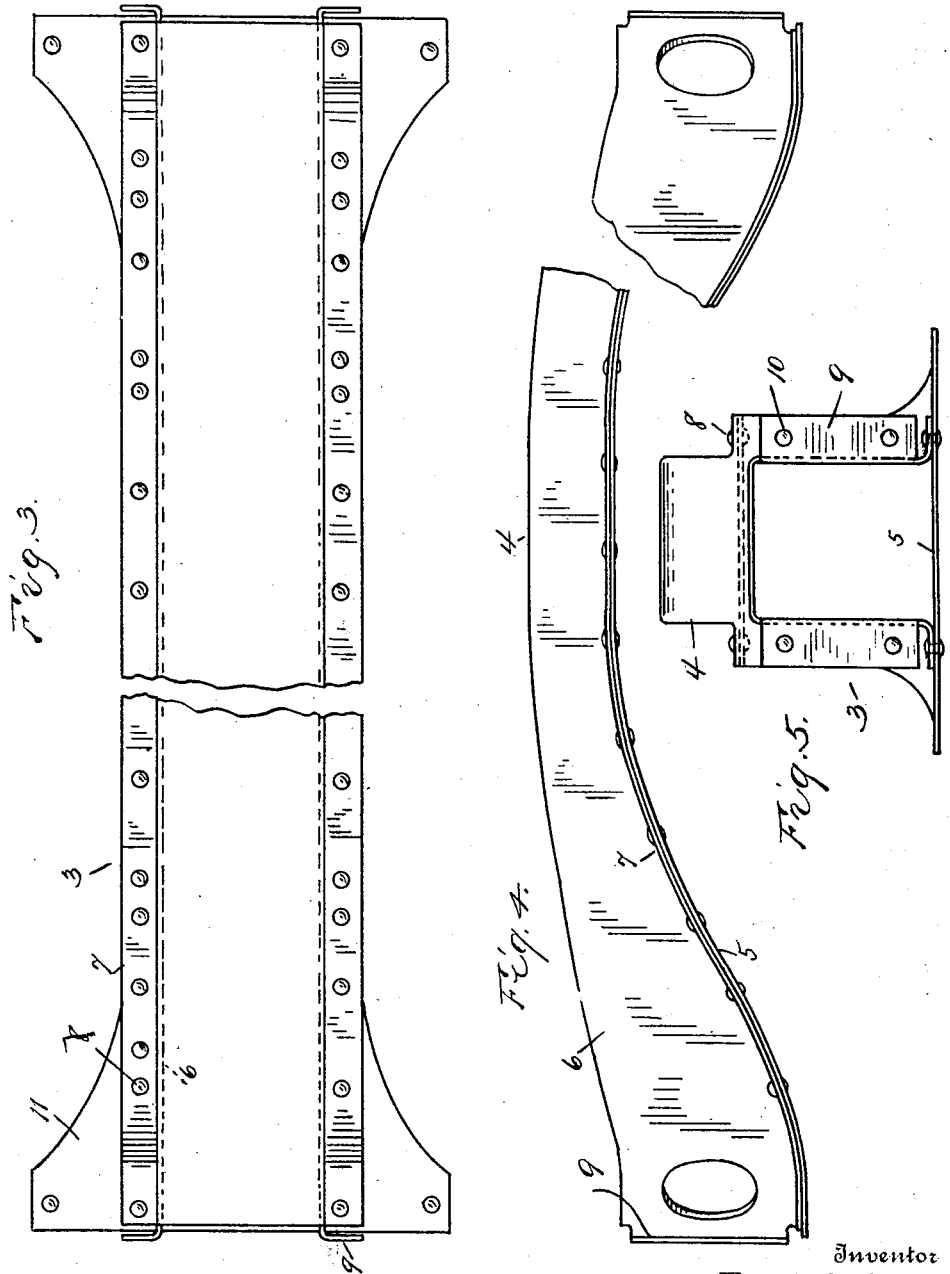

1,673,171

UNITED STATES PATENT OFFICE.

FRANK E. WATTS, OF DETROIT, MICHIGAN, ASSIGNOR TO HUPP MOTOR CAR CORPORATION, OF DETROIT, MICHIGAN, A CORPORATION OF VIRGINIA.

FRAME CONSTRUCTION.

Application filed September 15, 1924. Serial No. 737,866.

The invention relates to frame constructions and refers more particularly to frames of motor vehicles. The invention has for its main object the provision of a frame having side sills and an improved cross member extending therebetween for resisting the tortional stress to which the frame is subjected. Other objects of the invention reside in the novel features of construction and combinations and arrangements of parts as more fully hereinafter set forth.

In the drawings:

Figure 1 is a plan view of a motor vehicle frame embodying my invention;

Figure 2 is a side elevation thereof;

Figure 3 is an enlarged plan view of a cross member;

Figures 4 and 5 are respectively side and end elevations thereof.

1 and 2 are the side sills of motor vehicle frames and 3 the cross members, which extend between the side sills and are rigidly connected thereto. The side sills are preferably channel shaped and open inwardly toward each other.

As shown in the present instance, I have made the cross member 3, which is the third cross member from the rear end of the frame and is located near the middle thereof, hollow. This cross member comprises the upper downwardly opening channel shaped section 4 and the lower plate section 5 closing the channel shaped section, both sections being of sheet metal. The channel shaped section preferably bows upwardly from its ends and its side flanges 6 progressively decrease in depth from their ends to their middles. These side flanges are provided at their lower edges with the outwardly extending transverse flanges 7 to which the plate section 5 is secured by suitable means such as the rivets 8.

For securing the cross member to the side sills, the side flanges 6 of the channel shaped section 4, are provided at each end with the outwardly extending transverse flanges 9 which are adapted to be secured to the web of each side sill by suitable means, such as the rivets 10. Also the plate section 5 is provided at its opposite ends with the laterally extending gusset portions 11 which are adapted to be secured to both flanges of each side sill by suitable means, such as the rivets 12.

With this construction it will be readily seen that I have provided a simple construction of cross member which will effectively resist tortional stress to which the frame of the motor vehicle is subjected, since this cross member is of hollow construction. Also it will be seen that the cross member being formed of sheet metal sections may be manufactured at relatively low cost. Furthermore that the cross member has provision for rigidly attaching the same to the side sills.

What I claim as my invention is:

1. In a frame, the combination with side sills each having a vertical flange and a transverse flange, of a cross member extending between said side sills and comprising a channel shaped section and a plate section closing the channel, said channel shaped section having transverse flanges at its ends secured to the vertical flanges of said sills and said plate section having lateral gusset portions secured to the transverse flanges of said sills.

2. In a frame, the combination with side sills having vertical flanges and transverse flanges extending inwardly toward each other, of a cross member between said side sills comprising a downwardly opening channel shaped section having side flanges which progressively decrease in depth from their ends toward their middles, and a plate section secured to said side flanges at their lower edges, said side flanges having transverse flanges at their ends secured to the vertical flanges of said sills and said plate section having lateral gusset portions at its ends secured to the transverse flanges of said sills.

3. In a frame, the combination with side sills having transverse inwardly extending flanges, of a cross member extending between said side sills comprising a downwardly opening channel shaped section bowed upwardly between said side sills and having transverse foot flanges at the lower edges of its side flanges, and a plate section secured to said foot flanges throughout their length and having portions at its opposite ends secured to the transverse flanges of said sills.

4. In a frame, the combination with side sills, of a cross member between said side sills comprising a downwardly opening channel shaped section bowed upwardly between said side sills and having side flanges which progressively decrease in depth from their ends toward their middles, and a plate section secured to said side flanges at their lower edges closing said channel.

In testimony whereof I affix my signature.

FRANK E. WATTS.